United States Patent [19]
Yano

[11] Patent Number: 6,078,416
[45] Date of Patent: Jun. 20, 2000

[54] OPTICAL REGENERATIVE REPEATER

[75] Inventor: Yutaka Yano, Tokyo, Japan

[73] Assignee: NEC Corporation, Tokyo, Japan

[21] Appl. No.: 08/781,809

[22] Filed: Jan. 10, 1997

[30] Foreign Application Priority Data

Jan. 12, 1996 [JP] Japan ................................. 8-021770

[51] Int. Cl.[7] ............................. H04B 10/04; H04B 10/16
[52] U.S. Cl. ..................... 359/158; 359/176; 359/179; 359/181; 359/187; 359/299; 359/348
[58] Field of Search ...................... 359/158, 176, 359/181, 187, 188, 179, 346, 348, 349, 299

[56] References Cited

U.S. PATENT DOCUMENTS

| | | | |
|---|---|---|---|
| 5,401,957 | 3/1995 | Suzuki et al. | 359/187 |
| 5,548,433 | 8/1996 | Smith | 359/158 |
| 5,594,583 | 1/1997 | Devaux | 359/176 |
| 5,623,359 | 4/1997 | Giles et al. | 359/180 |
| 5,647,154 | 7/1997 | Yoneyama | 359/176 |
| 5,757,529 | 5/1998 | Desurvire et al. | 359/179 |

FOREIGN PATENT DOCUMENTS

| | | |
|---|---|---|
| 61-59574 | 12/1986 | Japan . |
| 2-36581 | 2/1990 | Japan . |
| 2-183236 | 7/1990 | Japan . |
| 4-22930 | 1/1992 | Japan . |
| 4-304432 | 10/1992 | Japan . |
| 8-248453 | 9/1996 | Japan . |

OTHER PUBLICATIONS

M. Nakazawa et al., "Experimental Demonstration of Soliton Data Transmission Over Unlimited Distances With Soliton Control in Time and Frequency Domains", *Electronic Letters*, vol. 29, No. 9, Apr. 1993, pp. 729 nad 730.

M. Suzuki et al., "Transform–Limited Optical Pulse Generation up to 20–GHz Repetition Rate by a Sinusodally Driven InGaAsP Electroabsorption Modulator", *Journal of Lightwave Technology*, vol. 11, No. 3, Mar. 1993, pp. 468–473.

*Primary Examiner*—Leslie Pascal
*Attorney, Agent, or Firm*—Young & Thompson

[57] ABSTRACT

An input optical data pulse 120 encoded by pulse amplitude modulation is branched into two parts by an optical coupler 111, and one part is input to an optical clock generation device, such as mode-locked laser diode (MLLD) 113 and the other part is input to an optical/optical intensity modulator, such as semiconductor optical amplifier 110 or electro-absorption light intensity modulator 210. A regenerated optical clock pulse drives the optical/optical intensity modulator and input optical data pulses 120 are intensity-modulated to serve as optical data pulses 121 which are output. An input optical data pulse can drive the light intensity modulator.

10 Claims, 5 Drawing Sheets

OPTICAL REGENERATIVE REPEATER

BACKGROUND OF THE INVENTION

1. Field of the Invention

The present invention relates to an optical regenerative repeater, particularly to an optical repeater preferably used for a digital optical transmission system.

2. Description of the Related Art

In the case of a signal transmitted through a transmission line, the waveform is distorted or noises or jitters are accumulated. When these analog deteriorations accumulate in an optical transmission signal, errors are increased to a serious level. Therefore, a signal regenerative repeater is used to receive a signal, discriminate the symbol and transmit the signal before errors accumulate up to such a level.

The function of the regeneration repeater roughly comprises reshaping for compensating attenuation and waveform distortion, retiming for removing jitters, and discriminating (regenerating) for re-discriminating symbols and removing noises. These are referred to as the "3R function". Some of the above analog signal-waveform deteriorations are fixed as permissible symbol errors and most of them are removed by the 3R functions. In the case of a present optical transmission system, every processing for the equalizing amplification can optically be made by an optical amplifier. However, recovery of deteriorations other than the processings for the equalizing amplification is performed by an electrical circuit.

In a general regenerative repeater, the transmission of electric signals (input signals) are branched to two parts, or pathways. A clock regenerator regenerates a clock signal from the branched transmission signal. The logical product (the AND logical operator) between a regenerated clock signal and the other branched transmission signal is taken by an intensity modulator to obtain a regeneration signal (output signal).

Japanese Laid-Open Patent Application No. 36581/90 also discloses an optical shaping device. In the device, the input optical signal is branched to two paths, one branched optical signal is input to an optical semiconductor laser amplifier, and another branched optical signal is converted to an electrical signal to extract the clock signal. The clock signal is superimposed on a driving current of the optical semiconductor laser amplifier.

As described above, a conventional regenerative repeater uses an electrical circuit for signal regeneration. However, it would be ideal if the optical signal could directly be regenerated. This is because the transmission signal is light and the regenerative repeater using the electrical circuit has a structure in which a receiver and a transmitter are arranged back to back. Therefore, the structure unavoidably becomes complex and expensive. Optical signal processing would make it possible to greatly simplify the structure and decrease the cost.

Also for the operation speed, the upper limit of the above-described electrical circuit processing is approx. 20 GHz and further acceleration of the operation speed is inherently limited. In the case of a transmitter and a receiver using optical signal processing, however, operation speeds up to approx. 1,000 GHz (1 Thz) have been demonstrated. Therefore, when the restrictions on the operation speed of an electrical circuit of a regenerative repeater have been removed, it can be expected that the transmission speed of a regenerative repeater system can greatly be improved.

SUMMARY OF THE INVENTION

An object of the present invention is to provide a simple and inexpensive all-optical regenerative repeater with a high operating speed.

To achieve the above object, an optical regenerative repeater of the present invention comprises an optical clock extraction device, which regenerate an optical clock pulse stream from an input optical data pulse stream, and an optical/optical intensity modulator, which is driven by an optical signal.

The optical/optical modulator has two essential inputs. One is a driving signal, and other is a signal which is modulated by the modulator and output from the modulator. Moreover, there are two input signal, i.e. clock and data signal. Therefore, two basic configurations are available depending on which is the driving signal and vise versa. In both basic configurations, the received data pulse stream is branched, and one part is led to the optical clock extraction step, and another part is led to the optical/optical intensity modulator.

The first basic configuration is shown in FIG. 3. While the clock pulse stream drives the intensity modulator, the data pulse stream is modulated through the intensity modulator.

The second basic configuration is shown in FIG. 4. While the data pulse stream drives the intensity modulator, the clock pulse stream is modulated through the intensity modulator.

In the first configuration, though the ability to remove waveform distortions or jitter is smaller than the second configuration, there is an advantage that even the optical/optical intensity modulator with a small extinction ratio can be used.

From the viewpoint of output light, input light is modulated to serve as output light in the case of the first configuration, while the second configuration can be provided with a function of replacing optical properties such as a wavelength and a pulse shape because the output light is completely replaced with the light originated form the clock extraction device.

In the present invention, a semiconductor optical amplifier or an electro-absorption modulator is used as the optical/optical intensity modulator. The detailed operation is explained below.

In the inventions described above, the main process is all-optical, so that the processing speed is expected to be in excess of the speed limit of the conventional electronic circuits.

On the other hand, a hybridized configuration described below is still effective, while the required operation speed is not so high. An optical regenerative repeater of the present invention comprises a step of converting a part of an input optical data signal to an electrical data signal in the light detection area of a semiconductor optical amplifier, a step of extracting a clock signal from the electrical data signal, a step of modulating a gain of the semiconductor optical amplifier in accordance with the extracted clock signal in an intensity modulation area of the semiconductor optical amplifier.

An optical signal regenerating method of the present invention includes a step of regenerating an optical clock pulse directly from an input optical data pulse, a step of intensity-modulating the input optical data pulse in accordance with the regenerated optical clock pulse, and a step of outputting intensity-modulated optical data pulse.

The other optical signal regenerating method of the present invention includes a step of regenerating an optical clock pulse directly from an input optical data pulse, a step of intensity-modulating the regenerated optical clock pulse in accordance with the input optical data pulses, and a step of outputting intensity-modulated optical data pulses.

Furthermore, the other optical signal regenerating method comprises a step of converting a part of an input optical data signal to an electrical data signal in the light detection area of a semiconductor optical amplifier, a step of extracting a clock signal from the electrical data signal, a step of modulating a gain of the semiconductor optical amplifier in accordance with the extracted clock signal in an intensity modulation area of the semiconductor optical amplifier and a step of outputting intensity-modulated optical data pulse.

The optical regenerating method of the present inventions make it possible to provide a simple, inexpensive, all optical regenerative repeater with a high operating speed.

BRIEF DESCRIPTION OF THE DRAWINGS

The above and other objects, feature and advantages of the present invention will become apparent from the following detailed description when taken with the accompanying drawing in which.

DETAILED DESCRIPTION OF THE PREFERRED EMBODIMENTS

Figure 1:
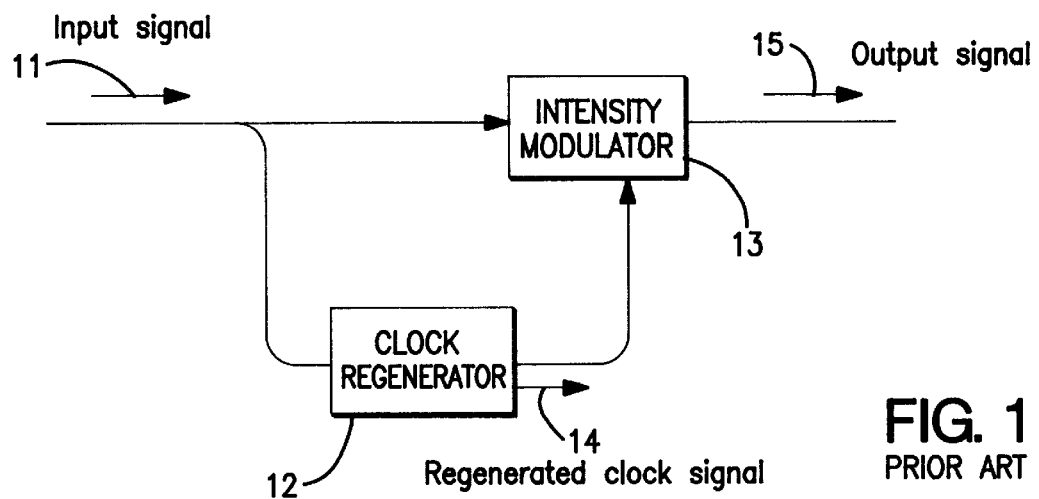
FIG. 1 shows a block diagram of a conventional regenerative repeater.
Figure 3:
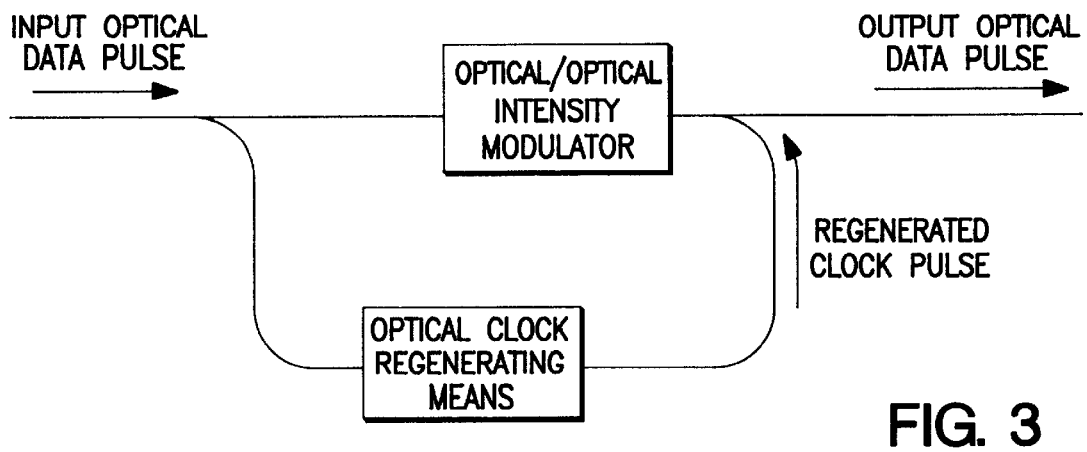
FIG. 3 shows a first basic configuration of the present invention.
Figure 5:
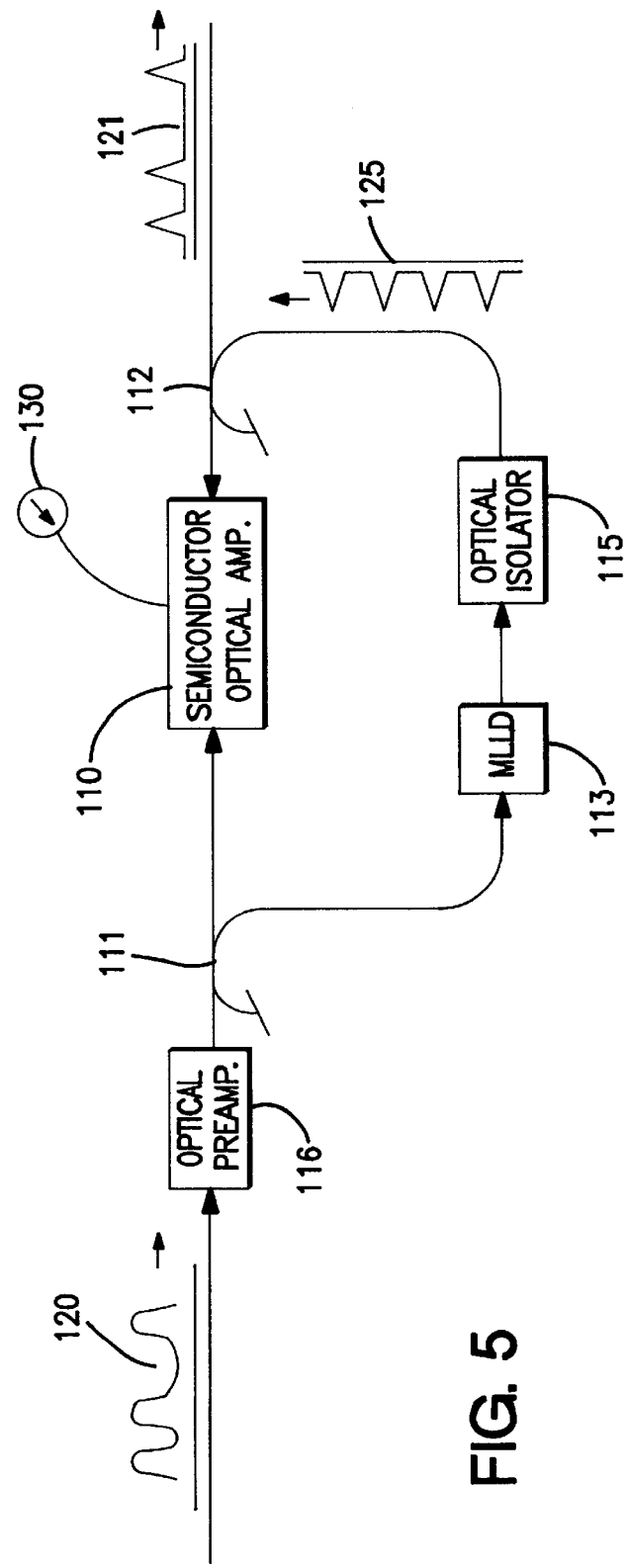
FIG. 5 is an illustration showing the first embodiment of the present invention.

Referring the FIG. 5, an optical regenerative repeater embodying the present invention is shown. This is the embodiment of the first basic configuration (FIG. 3) explained in the summary of invention.

In this embodiment, a semiconductor optical amplifier (SOA) 110 is used as the optical/optical intensity modulator. A proper excitation current 130 is injected to the SOA 110 from a DC source.

An input optical data pulse stream 120 is amplified through an optical preamplifier 116 and thereafter branched by an optical coupler 111. One of the branched data stream is input to a Mode-Locked Laser Diode (MLLD) 113, and other branched data stream is input to the SOA 110. The output clock pulse stream 125 of the MLLD 113 is synchronized with the clock frequency of the injected data stream. A regenerated optical clock pulse stream 125 is input to a SOA 110 through an optical isolator 115 and an optical coupler 112 in order to drive the modulator. The data stream is counterpropagated by the SOA 110 with clock stream 125, intensity modulated by the clock stream 125 and output as an optical signal 121.

Figure 4:
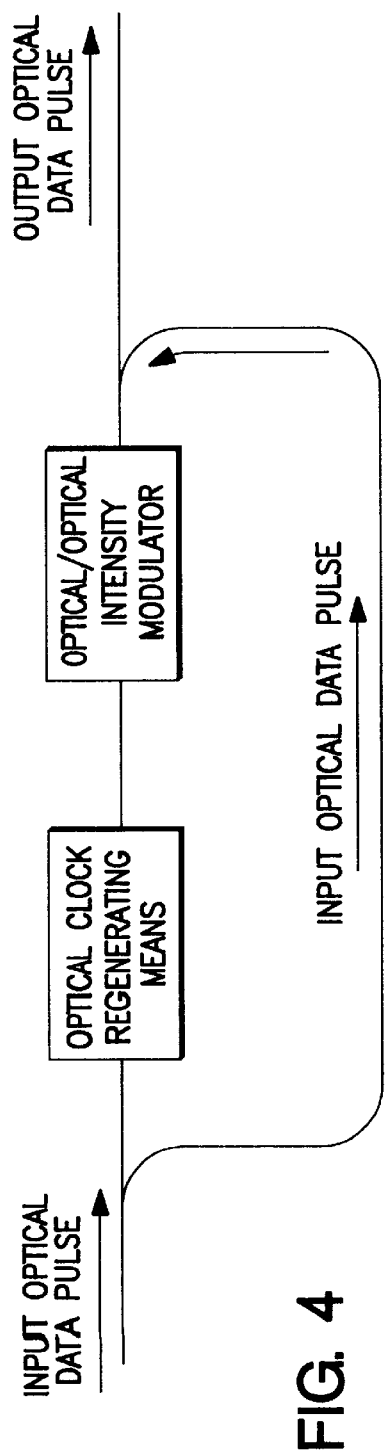
FIG. 4 shows a second basic configuration of the present invention.
Figure 6:
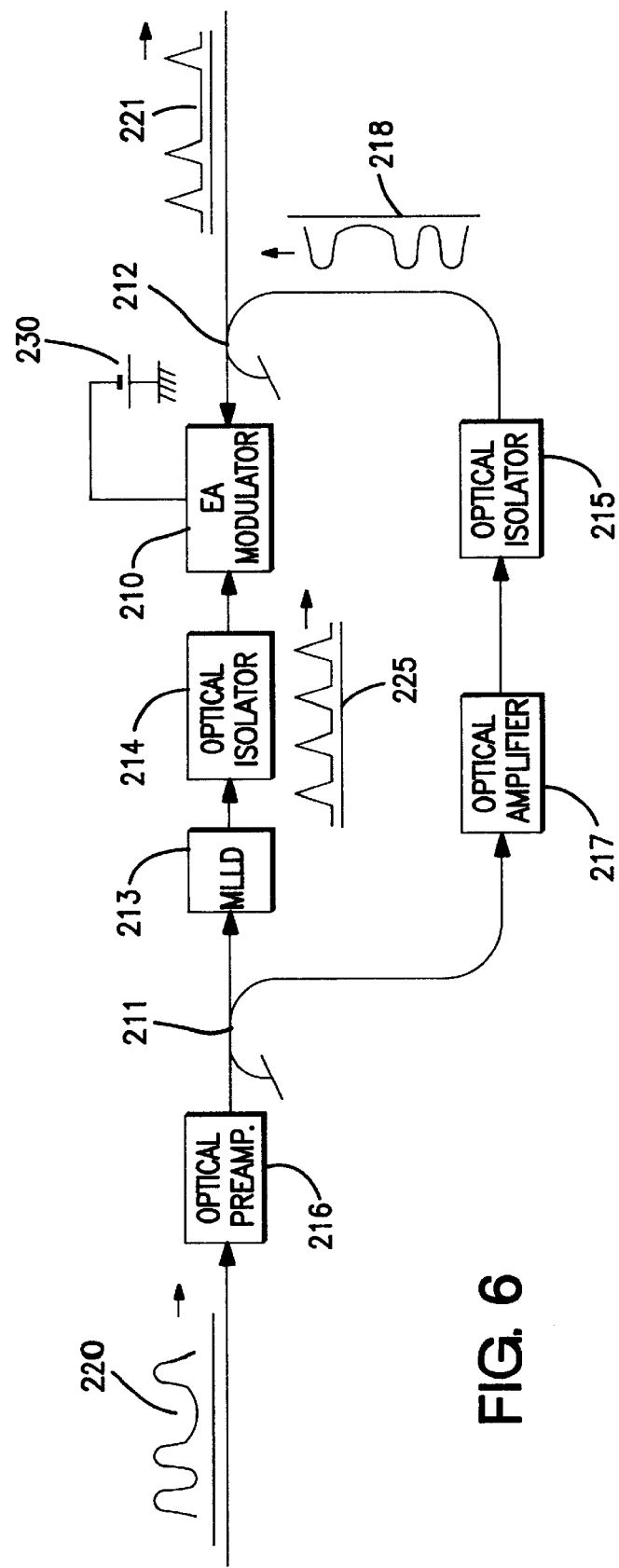
FIG. 6 is an illustration showing the second embodiment of the present invention.

FIG. 6 shows the second embodiment of the present invention. This is the embodiment of the second basic configuration (FIG. 4) explained in the summary of invention.

In this embodiment, an electro-absorption (EA) modulator 210 is used as the optical/optical intensity modulator. A proper bias voltage 230 is applied to the EA modulator 210 from a DC source.

An input optical data pulse stream 220 is amplified through an optical preamplifier 216 and thereafter branched by an optical coupler 211. One of the branched data stream is input to a Mode-Locked Laser Diode (MLLD) 213. The output clock pulse stream 225 of the MLLD 213 is synchronized with the clock frequency of the injected data stream. The other branched data stream is input to the EA modulator 210 through an optical isolator 215 and an optical coupler 212 in order to drive the modulator. A regenerated optical clock pulse stream 225 is counter propagated by the EA modulator 210 with data stream 225, intensity modulated by the data stream 225 and output as an optical signal 221.

As described in the summary section, the traveling direction of the input optical data pulse stream 120, 220 and that of the regenerated optical clock pulse stream 125, 225 which are input into the optical/optical intensity modulator 110, 210 are opposite relative to each other. Thereby, both streams can completely and easily be separated and no interference occurs even if their wavelengths are identical.

Though the above-described two embodiments use an optical device having one light input port and one light output port as the semiconductor optical amplifier 110 and the EA modulator 210, respectively, it is also possible to use optical devices having more than one light input port and more than one light output port. For example, it is possible to make the control light and signal light waveguides perpendicularly intersect each other.

Though the first embodiment uses a SOA in the case of first basic configuration and the second embodiment uses an EA modulator in the case of second basic configuration as an optical/optical intensity modulator another combination is also possible.

The structure of the SOA and the EA modulator are conventional, and its operation well known to those of skill in this art Then, operations of a SOA and an EA modulator serving as an optical/optical intensity modulator are described below.

A conventional structure of a SOA is same as a laser diode, and the reflectivity of its facets are made small to prevent a cavity resonance. A input light is amplified by the stimulated emission in the gain region of the SOA. A maximum output power of the SOA is limited by several factors such as injected excitation current, so that if the input optical power is too high, the gain is saturated and became small. It's called gain saturation effect.

The operation and features of optical/optical intensity modulation by the SOA are described below. Even if plural optical signals are input to the SOA, the gain saturation effect is subject to the total instantaneous input power. Therefore it is possible to transfer the waveform information of one signal to other signal through the gain modulation, with the proviso that the logic is reversed, i.e. if the control signal exist, the gate is closed. This is particularly called cross gain modulation. To use this effect positively, the wavelengths of the input lights should be in the gain band of the SOA.

Regarding operation speed, the rising time of the SOA is shorter than an conventional electrical circuit because very high speed (<1 ps) stimulated emission is utilized, but the fall time is as long as several GHz in general because it is limited by carrier lifetime.

The amplification function in the SOA contributes to maintain a signal-to-noise ratio (SNR). Though the noise reduction effect cannot be expected, jitter can be reduced.

Therefore, it is effective to a soliton pulse transmission system in which jitter determines the system performance.

The conventional EA modulator utilizes the Franz-Keldysh effect in which an absorption coefficient of a semiconductor is changed by the applied voltage. The absorption coefficient of the semiconductor increases exponentially in accordance with increase of applied reverse voltage. As the EA modulator serves a optical short-pulse generator, it has the nonlinear property in which the light transmittance to an applied voltage changes. This nonlinearity is reported in, for example, the document (M. Suzuki et al., Journal of Lightwave Technology, vol. 11, No. 3, pp. 468–473, 1993).

The operation and features of optical/optical intensity modulation by the EA modulator are described below through the second embodiment. Because the clock light 225 is absorbed by the EA modulator 210 to serve as a photoelectric current and temporarily counterbalances the bias voltage 230 through the registive load and an absorption coefficient of EA modulator is modulated. Consequently, the data pulse stream 220 is modulated.

In the case of the EA modulator 210, the wavelengths of the data light 220, the regenerated clock light 225 and the energy band gap of the EA modulator 210 are set to values which are close to each other. Because the energy band gap can be fine-adjusted by the bias voltage 230 of the EA modulator 210, the bias voltage is set from the bias efficiently intensity-modulated by the clock light 225.

In the case of RZ (Return to Zero) pulse transmission, it is possible to reshape a widened pulse by taking the logical product (AND) with clock light having a small pulse width. This advantage is more effective for an EA modulator having a strong nonlinearity.

When the intensity of a light signal is insufficient to maintain an adequate signal-to-noise ratio or drive an optical device in the above first and second embodiments, an optical amplifier can properly be inserted. In the case of above embodiments, the control light may pass through the modulator after driving the modulator and go backward to a transmission line. To prevent this, it is possible to insert an optical isolator into the input of the present regenerative repeater.

In the case of the above embodiments, an optical waveguide for connecting optical devices to each other uses an optical fiber. However, by using a semiconductor waveguide instead of the optical fiber, it is possible to form a SOA and an EA modulator on the same semiconductor substrate as the optical waveguide. Therefore, it is possible to integrate the whole regenerative repeater into one body. Thus, the number of optical-axis adjustment portions can greatly be decreased and this is advantageous in terms of cost.

In the case of the above embodiments, it is important to perform a relative phase adjustment between the clock pulse stream and the data pulse stream in the optical/optical intensity modulator. In the case of an EA modulator, it is effective to adjust the relative phase so that their pulse peaks coincide at the EA modulator. In the case of a SOA, the prefer relative phase depends on the basic configurations. In the case of the first basic configuration with a SOA, it is effective to adjust the optical clock pulse peaks to a middle position between the optical data pulses.

To perform the relative phase adjustment, an optical delay line can be used. Moreover, it is also possible to provide a MLLD having a phase adjustment function. The phase of the clock light output from the MLLD can be adjusted by the injected optical power, injected current, or bias voltage.

The above embodiments are described by using an optical device having two light input/output ports. However, it is also possible to use optical waveguides as means for separatially separating signal light from control light so that both waveguides intersect each other in an optical/optical intensity modulation area in which they interact.

Figure 7:
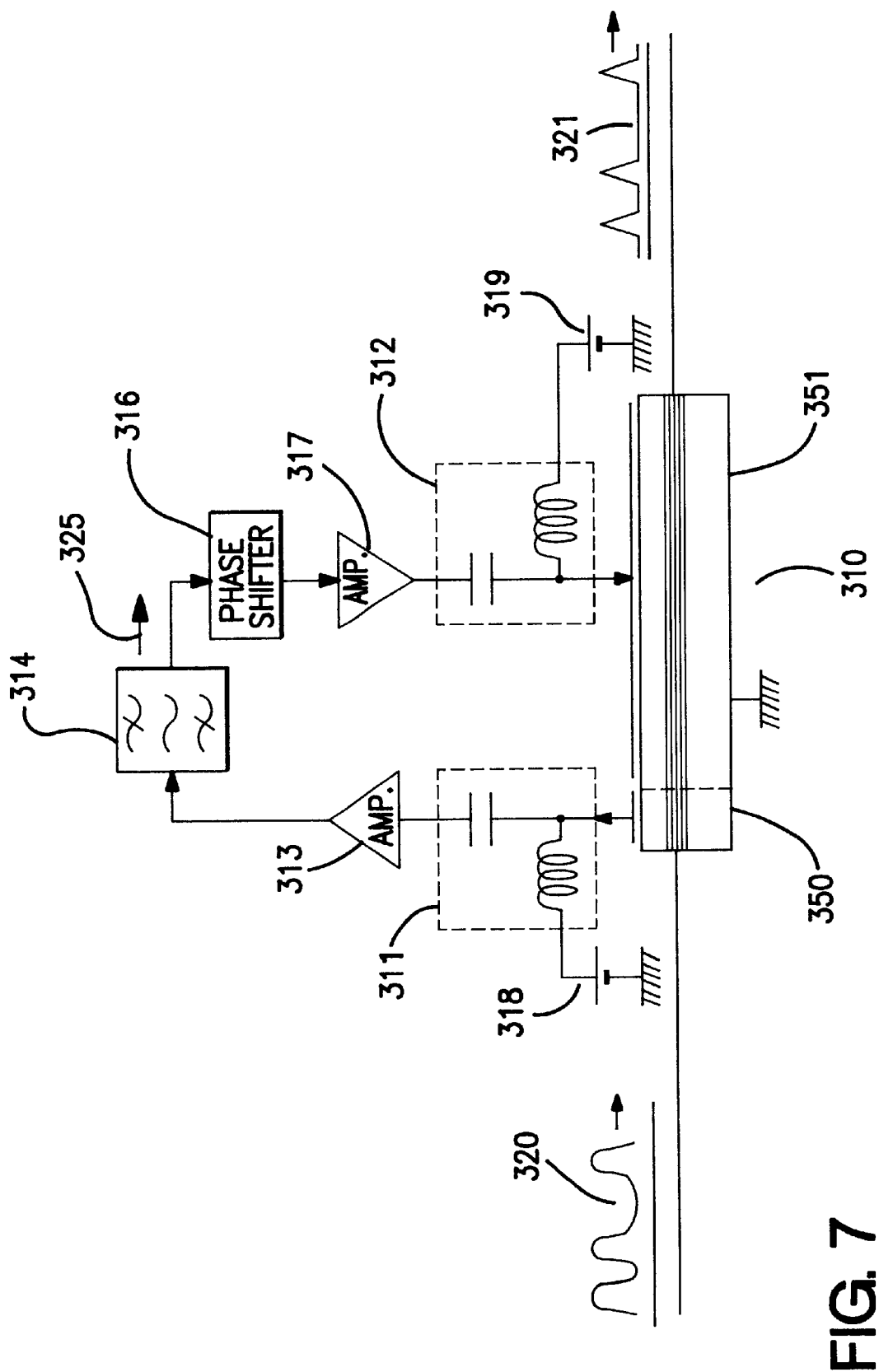
FIG. 7 is an illustration showing the third embodiment of the present invention.

FIG. 7 is an illustration showing the third embodiment of the present invention.

The electrode of a semiconductor optical amplifier 310 is divided into a plurality of parts, in which the light input side is used as a light detection and amplification area 350 and the light output side is used as an intensity modulation and amplification area 351.

An excitation current is applied to each area of the semiconductor optical amplifier 310 from DC sources 318 and 319 through bias tees 311 and 312. A band-pass filter 314 is connected to the bias tee 311 through amplifier 313, a phase shifter 316 is arranged between the band-pass filter 314 and bias tee 312 via an amplifier 317.

Part of the input optical data pulse 320 is photoelectrically converted, modulating the number of carriers in the light detection area 350 and the remaining parts of the input optical data pulse 320 are made to enter the intensity modulation area 351. Among the photoelectrically converted electric signals, only clock components pass through the band-pass filter 314 and the phase shifter 316, and they are added to the intensity modulation area 351. The input optical data pulse 320 is reduced in jitter when it passes the intensity modulation area 351 and converts to an output optical data pulse 321.

In FIG. 7, the bias tee 311, the amplifier 313, the band-pass filter 314, the phase shifter 316, the amplifier 317, the bias tee 312 constitute, in combination, are an electrical clock signal regeneration circuit.

Figure 8:
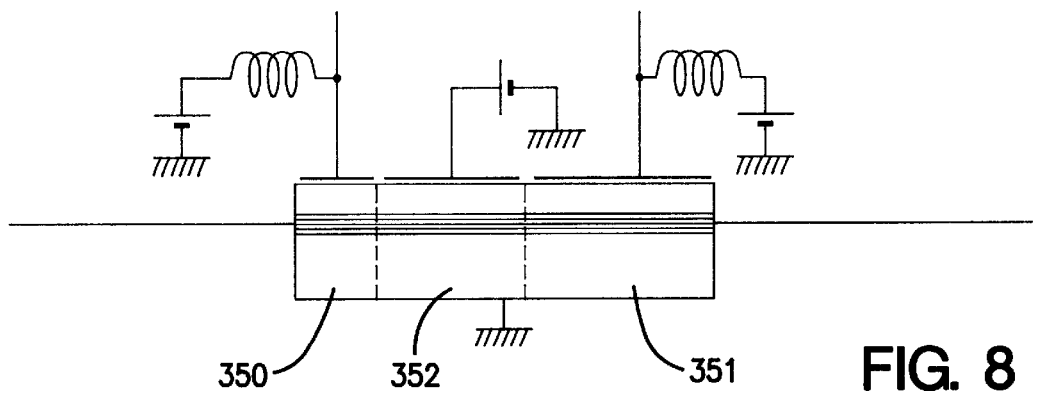
FIG. 8 is an illustration showing the semiconductor optical amplifier with the three divided electrodes.
Figure 2:
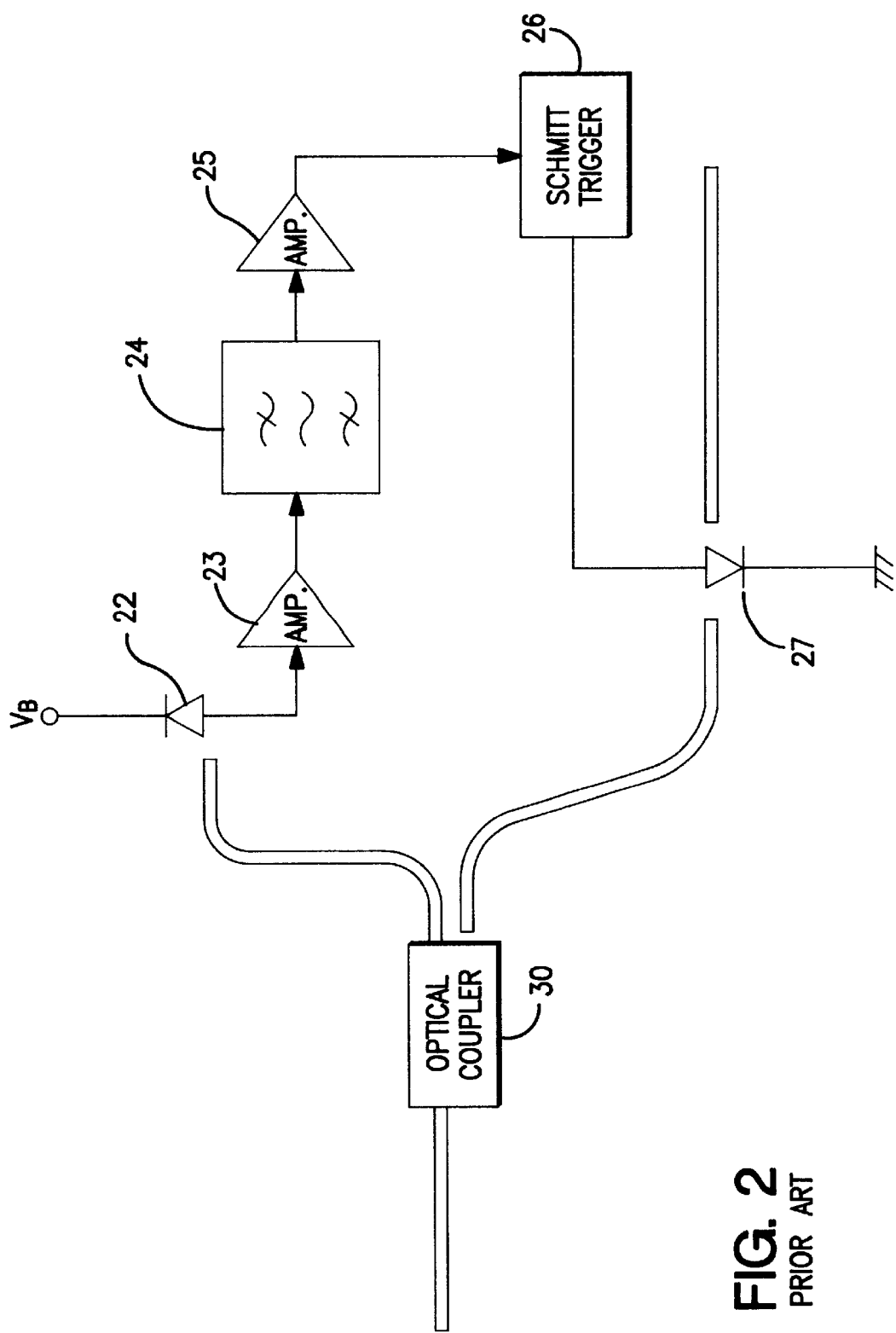
FIG. 2 shows a block diagram of another conventional regenerative repeater.

In this embodiment, the electrode of the semiconductor optical amplifier 310 is divided into two parts. However, it is possible to divide the electrode into three or more parts. For example, it is possible to divide the electrode into three parts, namely a light detection area, a light amplification area, and a light modulation area as shown in FIG. 8. Moreover, it is possible to integrate an EA modulator as a light modulation area by using the selective growth technology or the like. The areas may have common or separate DC sources.

As described above, the first and second embodiments of the present inventions make it possible to provide a simple, inexpensive, exclusively optical regenerative repeater which is operated at a very high speed without being limited to the operation speeds of electronic circuits. The embodiments can be applied to a time-domain soliton controller. By using a structure for providing an optical drive signal, the signal is not influenced by stray capacitances, thereby, a remarkable function is obtained that the operating speed limit can be raised by several orders of magnitude.

Though the inherent speed limitations of the electric circuit remains, the third embodiment has a simple structure compared to the first and second embodiments. The third embodiment can be applied to a time-domain soliton controller.

While the present invention has been described in connection with certain preferred embodiments, it is to be understood that the subject matter encompassed by the present invention is not limited to those specific embodiment. On the contrary, it is intended to include all alternatives, modifications, and equivalents as can be included within the spirit and scope of the following claims.

What is claimed is:

1. An optical regenerative repeater comprising:

an optical clock regeneration device directly regenerating an optical clock pulse stream from an input optical data pulse stream; and an optical electro-absorption light intensity modulator receiving the input optical data pulse stream and the regenerated optical clock pulse stream and outputting an intensity-modulated optical data pulse.

2. The repeater of claim 1, further comprising an optical coupler that branches the input optical data pulse stream to said optical clock regeneration device and to said optical electro-absorption light intensity modulator.

3. The repeater of claim 2, wherein the input optical data pulse stream and the regenerated optical clock pulse stream propagate in opposite directions through said optical electro-absorption light intensity modulator.

4. The repeater of claim 1, wherein said optical electro-absorption light intensity modulator is driven by the regenerated optical clock pulse stream.

5. The repeater of claim 1, wherein said optical electro-absorption light intensity modulator is driven by the input optical data pulse stream.

6. An optical regenerative repeater comprising:

an optical clock regeneration device directly regenerating an optical clock pulse stream from an input optical data pulse stream; and an optical electro-absorption light intensity modulator receiving the input optical data pulse stream and the regenerated optical clock pulse stream and outputting an intensity-modulated optical data pulse, wherein said optical clock regeneration device comprises a mode-locked laser diode.

7. An optical regenerative repeater comprising:

an optical clock regeneration device directly regenerating an optical clock pulse stream from an input optical data pulse stream; and a semiconductor optical amplifier receiving the input optical data pulse stream and the regenerated optical clock pulse stream and outputting an intensity-modulated optical data pulse, wherein the input optical data pulse stream and the regenerated optical clock pulse stream propagate in opposite directions through said semiconductor optical amplifier.

8. The repeater of claim 7, further comprising an optical coupler that branches the input optical data pulse stream to said optical clock regeneration device and to said semiconductor optical amplifier.

9. An optical regenerative repeater comprising:

an optical clock regeneration device directly regenerating an optical clock pulse stream from an input optical data pulse stream; and a semiconductor optical amplifier receiving the input optical data pulse stream and the regenerated optical clock pulse stream and outputting an intensity-modulated optical data pulse, wherein said semiconductor optical amplifier is driven by the regenerated optical clock pulse stream.

10. An optical regenerative repeater comprising:

an optical clock regeneration device directly regenerating an optical clock pulse stream from an input optical data pulse stream; and a semiconductor optical amplifier receiving the input optical data pulse stream and the regenerated optical clock pulse stream and outputting an intensity-modulated optical data pulse, wherein said optical clock regeneration device comprises a mode-locked laser diode.

* * * * *